United States Patent [19]

Tomalia et al.

[11] 3,773,550
[45] Nov. 20, 1973

[54] INHIBITING DEGRADATION AND CORROSION OF SOLID SUBSTRATES BY APPLICATION THERETO OF A CURABLE COATING OF A POLYEPOXIDE AND AN OXAZINE OR OXAZOLINE

[75] Inventors: Donald A. Tomalia; Donald L. Schmidt, both of Midland, Mich.

[73] Assignee: The Dow Chemical Company, Midland, Mich.

[22] Filed: May 3, 1971

[21] Appl. No.: 139,880

[52] U.S. Cl. .................... 117/132 BE, 117/161 ZB
[51] Int. Cl. .................... B32b 15/08, C09d 3/58
[58] Field of Search .................. 260/2 N, 47 EN; 117/132 BE, 161 ZB

[56] References Cited
UNITED STATES PATENTS

| | | | |
|---|---|---|---|
| 3,630,996 | 12/1971 | Tomalia | 117/161 X |
| 3,519,602 | 7/1970 | Castro et al. | 117/132 X |
| 3,493,568 | 2/1970 | Levy et al. | 260/244 |
| 3,563,920 | 2/1971 | Tomalia et al. | 424/248 |
| 3,509,231 | 5/1970 | Ranck et al. | 260/2 X |
| 3,538,184 | 11/1970 | Heer | 117/132 X |
| 3,042,545 | 7/1962 | Kienle et al. | 117/132 X |
| 3,074,974 | 1/1963 | Gebura | 117/132 X |
| 2,967,172 | 1/1961 | Hood | 117/132 X |
| 3,598,636 | 8/1971 | Honeycutt | 117/132 X |

*Primary Examiner*—Ralph Husack
*Assistant Examiner*—Harry J. Gwinnell
*Attorney*—Griswold et al.

[57] ABSTRACT

A method of minimizing the degradative or corrosive effect of ionic materials on solid substrate surfaces comprising coating such surfaces with a curable composition comprising essentially (1) a polyepoxide and (2) an oxazine or oxazoline curing agent.

2 Claims, No Drawings

INHIBITING DEGRADATION AND CORROSION OF SOLID SUBSTRATES BY APPLICATION THERETO OF A CURABLE COATING OF A POLYEPOXIDE AND AN OXAZINE OR OXAZOLINE

BACKGROUND OF THE INVENTION

There has long been interest in coating materials to withstand the degradative effects of ionic influences. Two of such instances, the effects of which often coact, are corrosion and ultraviolet light degradation. In the case of chemical substances of a polymeric nature, untraviolet chemical reactions usually tend toward breakdown of the polymer structure and, correspondingly, strength is greatly diminished. Such photochemical degradation is commonly manifest in the surface breakdown which, in paints and the like, is sometimes called "chalking off;" in the dulling of automobile paint; and in the development of weather cracks and "crazing" (finely reticulate surficial cracking) of formed plastic articles. Generally, all these phenomena are undesirable.

Corrosion is, in general, the reaction of metal, or other mineral substance which is a metallic compound, with an ionic material, as a result of which the metal or other substance is converted to, typically, a salt. Such salts are not of a form which have desirable mechanical strength, and tend to be removed readily, e.g., by weathering. The result is the degradation and weakening of the metal surface with accompanying discoloration and contamination. In the instance of corrosion, the ionic species may be water borne, as in the halide salts in sea water, the spray of which is notoriously corrosive; or air borne, as in the instance of carbon dioxide and sulfur dioxide. These and other gases, vented into the air, quickly associate, at least in part, with water to produce ionic species that are highly corrosive.

The use of organic coatings for corrosion control has at times been self-defeating; paint and similar coatings, for example, once broken in any way, often lift away from the surface to which they were applied, and in doing so, provide capillary crevices and recesses and the like which tend to hold, for example, corrosive aqueous matter in intimate contact with the metal or the like which such coating was originally to have protected. In this fashion, a coating intended to be protective may enhance the "creep" of corrosion beneath the supposedly protective coating.

While the use of organic coating substances to inhibit corrosion, is of great antiquity and includes animal fat, tree rosin, and beeswax, and more recently has embraced paint-like and polymeric substances of great variety, no specific art closer to this invention than the diffuse art of the amine-cured epoxy resins is presently known.

SUMMARY

It has been discovered, which discovery forms the present invention, that application to a substrate surface of a curable composition comprising essentially (1) a polyepoxide and (2) an oxazine or oxazoline curing agent will effectively inhibit ion induced degradation or corrosion of such surface even when such coating is scratched or otherwise scored to the extent of directly exposing a portion of the substrate surface to the ionic influence.

DESCRIPTION OF THE PREFERRED EMBODIMENTS

The preparation of cured systems, composed of a polyepoxide and an oxazine compound are generally known, e.g., as described in Belgium Pat. No. 752,047, issued Dec. 16, 1970.

The polyepoxide employed in the preparation of the curable composition used in the present invention may be any of the known curable polyepoxides. Especially useful are those compounds having an average of more than one 1,2-epoxy-aliphatic group per molecule and particularly the polyglycidyl ethers of polyhydric phenols such as the diglycidyl ether of bisphenols A and F; their partially halogenated counterparts such as the diglycidyl ether of tetrabrominated bidphenol A; epoxylated derivatives of the novolacs such as their reaction products under basic conditions with epichlorohydrin; and terminally epoxylated polyalkylene glycols such as the doubly epoxylated polyethylene and polypropylene glycols.

Such polyepoxide may also be modified in a manner known in the art, as by blending with minor amounts of a urethane prepolymer, a polyester, a polyamide or the like with the objective of improving a property of the resulting resin such as adhesivity and impact resistance.

Particularly suitable for use as an oxazine or oxazoline in the preparation of such latent curable prepolymers is a monooxazine or monooxazoline compound that is unsubstituted 2-oxazoline or unsubstituted 5,6-dihydro-4H-1,3-oxazine, or either of the foregoing with, as substituent upon the 5- or 6-position, alkyl of from one to 10 carbon atoms; or any of the same with as substituent on the 2-position, alkyl of from one to 10 carbon atoms; cycloalkyl of from three to six carbon atoms; alkenyl, alkadienyl, or alkatrienyl of from one to 10 carbon atoms; alkoxy of from one to 10 carbon atoms; alkylol of from one to 10 carbon atoms; nitro; furyl; fluoro; chloro; bromo; iodo; trifluoromethyl; chloroalkyl or bromoalkyl of $n$ carbon atoms and from one to $2n+1$ halogens, $n$ being from one to 10; alkoxyalkyl or alkylthioalkyl in either of which any alkyl is of from one to 10 carbon atoms; alkylthio of from one to 10 carbon atoms; phenyl; or substituted phenyl in which a substituent upon such substituted phenyl is from those above designated there being from one to five of such substituents upon said phenyl.

Among the specific oxazine compounds that may be used, each being a 5,6-dihydro-4H-1,3-oxazine, are 2-vinyloxazine, 6-methyl-6-phenyl-2-vinyloxazine, 6-methyl-2-(2-piperidinoethyl)-6-vinyloxazine, 6-methyl-2,6-divinyloxazine, and 2-methyloxazine.

Among the oxazoline compounds that may be employed are 2-methyloxazoline, 2,4-dimethyloxazoline, 2-ethyloxazoline, 2,5-dimethyloxazoline, 4,5-dimethyl-2-vinyloxazoline, 2-propyloxazoline, 2-cyclopropyloxazoline, 2-vinyloxazoline, 4-methyl-2-vinyloxazoline, 5-methyl-2-vinyloxazoline, 2-isopropenyl-2-oxazoline, 2-isopropenyl-4,5-dimethyloxazoline, 5-decyl-2-vinyloxazoline, 2-ethoxyoxazoline, 2,4-dimethyl-4-methanoloxazoline, 2-ethoxy-2-oxazoline, 2-(2-methoxy-1-methylethyl)oxazoline, 2-(2-(hexyloxy)ethyl)-oxazoline, 2-(ethylthio)oxazoline, 2(2-(butylthio)-1-methylethyl)oxazoline, 2-(1-methyl-2-(octylthio)ethyl)oxazoline, 2-(1-methyl-2-(dodecylthio)ethyl)oxazoline, 2-(dichloromethyl)oxazoline, 2-(trichloromethyl)oxazoline, 2-(1,1-dichloroethyl)- and 2-(1,1-dichloropropyl)oxazoline, 2-(1,1,3-trichloropropyl) oxazoline, 2-(2-furyl)oxazoline, 2-phenyl-oxazoline, 2- (*m*-tolyl)oxazoline, 2-(*p*-tolyl)oxazoline, 5-methyl-2-phenyloxazoline, 2-(*p*-methoxyphenyl)oxazoline, 2-(*p*-chloro-phenyl)oxazoline and its *o* and *m* isomers, 2-*p*-fluorophenyloxazoline, 2-(*m*-bromophenyl)oxazoline, 2- (p-bromophenyl)oxazoline, the *m*, *p*, and *o*-2-$\alpha,\alpha,\alpha$-trifluorotolyl)oxazolines, 2-(*p*-nitrophenyl)oxazoline and its *m* and *o* isomers, 2-styryloxazoline, 5,5-dimethyl-2- (3,4-xylyl)oxazoline, 2-(3,4-dimethoxyphenyl)-oxazoline, 5,5-dimethyl-2-(3,4,5-trimethoxyphenyl)oxazoline, 4,4- dimethyl-2-(3,4,5-trimethoxyphenyl)oxazoline, 2-( *p*- methoxyphenyl)5-phenyloxazoline, and 2((3,4-dichlorophenoxy)methyl)-oxazoline.

In general, a monooxazine or monooxazoline, when used as the curing agent, is employed in an amount of from one to 49 equivalent weight percent by weight of the composition. However, as the amount of monooxazine of monooxazoline combined with curable polyepoxide is reduced below that amount which is equivalently stoichiometric, the strength of the resulting resins rises and continues to increase to a maximum from about 10 to about 40 equivalent percent by weight of curable mixtures. Below about five equivalent percent, good resins continue to be formed but curing time becomes longer.

Various methods for preparing monooxazine and monooxazoline compounds are known. One convenient method involves reacting a nitrile with trimethylene chlorohydrin or ethylene chlorohydrin in presence of hydrogen chloride and then cyclizing the intermediate thus formed with a base such as triethylamine, trimethylamine, or an alkali metal hydroxide. The cyclizing reaction is generally exothermic and is preferably carried out at a temperature within the range of from 0° to 10° C.

Also suitable for use is a di-2-oxazine or di-2-oxazoline compound, such as for example a compound of the formula

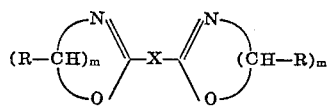

wherein X represents

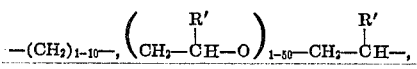

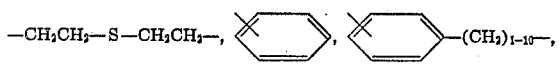

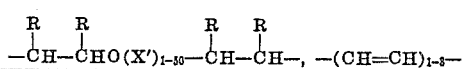

and in the above formulae each R represents hydrogen or alkyl having from one to four carbon atoms, each R' represents hydrogen or alkyl having from one to three carbon atoms, *m* represents two or three, and X' represents ethyleneoxy or propyleneoxy.

In general, the di-2-oxazine or di-2-oxazoline is employed in an amount of from one to 100 equivalent percent based on epoxy functionality. An amount within the range of from 25 to 100 equivalent percent is preferred, and in some cases at least, the optimum amount is about 100 equivalent percent.

The di-2- oxazoline and di-2-oxazine compounds are prepared by any of a group of synthetic routes all of which pass, advantageously, through a cyano group; in the sense that, at each molecular site where an oxazine or oxazoline heterocycle is desired, there is provided as a precursor site, a cyano. From such site it is, in general, convenient and easy to go on to the desired heterocycle. The only condition believed to be limiting is that, with respect to the reactions that go on from the cyano to the heterocycle, preferably the cyano be the most reactive or only significantly reactive site; or, if any other site on the starting cyano compound be more reactive than cyano, then known alternative procedures must be considered. Such procedures are described in U.S. Pat. No. 3,563,920 issued Feb. 16, 1971.

Initial curing of the polyepoxide and the oxazine or oxazoline is normally effected by heating, characteristically at a temperature above 50° C and preferably about 120° C over a period of from about 20 to 30 minutes.

The so-formed linear prepolymers can be maintained as low viscosity liquids by merely warming them at 35°–80° C. They can be kept under these conditions for several days to a week without serious viscosity increases, thus allowing use in "prepreg" applications. Thermal cures (150° C) can produce gelation in about 1/2 hour and crosslinked resins can be effected by heating for 1–8 hours in the absence of any additives.

Representative of a corrosion-susceptible substance to be protected according to this invention is sheet mild steel such as that used in bodies of automobiles, trucks, boats and ships; household appliances, industrial equipment, hoppers, bins, storage and transfer structures and the like. In addition to sheet materials typically produced by rolling and the like, such corrosion-susceptible materials include also drop-forged, cast, wrought, and otherwise formed articles of ferrous metals.

While by reason of corrosion-susceptibility and industrial importance the ferrous metals will perhaps be the most important, other metals are similarly protected; although the precise extent of protection and rate of corrosion while protected according to this invention will vary with the identity of the metal and the nature of its exposure. In some exposure, for example, copper and nickel and their alloys are susceptible of corrosion; and they are protected according to this invention. Similarly, metallic magnesium, while is oftentimes of a bright finish, when newly fabricated, sometimes corrodes in air to a dull gray finish. The new finish of magnesium is protected according to this invention. In those situations in which aluminum is corroded, as by pitting and the like, the present invention is of use to protect it.

It is conjectured that the curable coating used in the instant invention functions upon some kind of ion capture not hitherto well described in the literature; and that it acts to capture ions that, if not captured, would enhance corrosion.

The following example is intended to illustrate the present invention but is not to be construed as limiting its scope.

EXAMPLE

In each of a series of experiments the following reaction products were prepared utilizing as a poly-epoxide, a diglycidyl ether of bisphenol A having an epoxy equivalent weight of 186–192.

| Sample designation | Poly-epoxide (gms.) | Di-2-oxazoline Type | Gms. |
|---|---|---|---|
| The invention: | | | |
| A | 88 | 2,2'-(thiodiethylene) bis-2-oxazoline | 55 |
| B | 88 | ....do.... | 27.5 |
| C | 69.8 | 2,2'-(oxydiethylene) bis-2-oxazoline | 39 |
| D | 56.4 | ....do.... | 15.9 |
| E | 60.2 | (Tetramethylene)bis-2-oxazoline | 31 |
| F | 84 | ....do.... | 22 |

Each of the reaction products designated as Samples A through F were prepared by admixing the designated ingredients at normal room temperatures. The resulting noncured admixtures were then separately used to coat individual mild steel coupons, and the coating cured by heating at a temperature of about 150°C for a period sufficient to effect a substantially complete cure. The coating on each coupon was then scored by drawing a graver across each coupon in a uniform pattern leaving a scratch which passed completely through the coating and into the metal below.

Each coated coupon was then subjected to a continuous spray of aqueous sodium chloride. After 10 days of such exposure, each of the coated coupons were substantially free of any evidence of rusting and the coating remained tightly adherent to the coupon even in the area immediately next to the scratched portion.

In further testing, individual coupons having separate cured coating as described herein were placed in a fadeometer and subjected to ultraviolet radiation for extended periods of time. After 20 days of exposure none of the coupons containing the coatings of the samples designated A through F evidenced any significant degradative effects.

By way of comparison, a coating material was prepared by reacting the diglycidyl ether of bisphenol A, described herein, with substantially stoichiometric amounts of the hardener diethylene triamine; followed by preparation and exposure of the coated mild steel coupons by the techniques as herein described. It was found that such coated coupons evidenced significant evidence of corrosion at the scratch following 10 days of exposure to the aqueous sodium chloride spray with attendant loosening of the coating material, particularly in the area next to such scratch. Further, other coupons coated with this polyepoxide, and placed in a fadeometer, evidenced early formation of a removable chalky overcast on the surface of the coating, and, after 10 days of exposure, were significantly discolored and embrittled.

It is to be understood that the method comprising the present invention is also applicable to inhibiting degradation or corrosion of various other materials such as marble, alabaster, diorite, jade and sandstone. Further, as indicated supra, the agent causing corrosion will usually be environmental, including aspects of the special environments created by various industrial applications. As being environmental, it will usually comprise water or at least the vapor of water or water as moisture; and air or air modified by partial addition of pollutants or partial removal of natural components. In addition to water and air, a corrosive agent from which this invention gives protection usually comprises some ion-yielding, or ion-enhancing agent.

Among the corrosive agents thus comprehended are galvanic currents from bimetallic and similar "couples" including those that are not usually recognized, such as aluminum deck strip material in contact with a ferrous metal truck body or ship deck in the presence of air and salt brine; also electrical potentials deriving from commercial and industrial power sources.

Other ion-yielding or ion-enhancing agents from corrosion by which this invention gives protection include seawater and its spray or mist, brines evolved on pavement from use of salts to melt ice in winter, ionic salts yielded by chemical fertilizers to be added to soil to enhance growth of plants, when such fertilizers are wetted with water; acids and salts from galvanic cells or batteries of such cells used to produce electric current from chemical sources; hydrogen sulfide, mercaptans, and similar corrosive components of petroleum and its fractions; substances that dissociate in water to yield ions, as encountered in the chemical and related industries such as acids, halogens, ionic surfactants; herbicides that are acids or are derived from acids; latexes and other emulsions; acidic and otherwise corrosive natural and modified natural products including manures, sour milk, humus, silage waste, liquor from sulfite paper making processes, sugar refinery wastes, and the like. Also, similar agencies but at elevated temperatures, as in flue gases, steam, vapor effluent and the like.

While the protection afforded by the process of the instant invention, functioning above, is of value, other means of corrosion inhibition and control may be employed conjointly with the present invention, if desired. Thus, a metal surface to be protected from aqueous corrosion such as aqueous salt corrosion may be plated with a corrosion inhibiting metal such as zinc over mild steel; or may be afforded electrical or electrochemical cathodic protection, if desired, in addition to the protection by this invention.

What is claimed is:

1. A method for inhibiting ion induced degradation and corrosion of solid substrates comprising (1) applying to such substrate a curable composition comprising (A) a diglycidyl ether of 4,4'-isopropylidenediphenol and (B) as a curing agent, a di-2-oxazoline compound of the formula

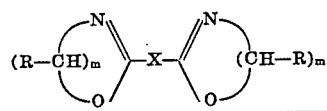

wherein X represents

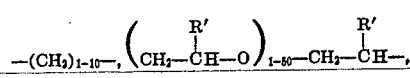

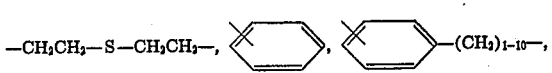

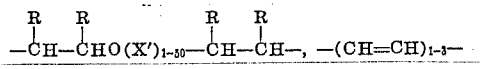

and in the above formulae each R represents hydrogen or alkyl having from one to four carbon atoms, each $R'$ represents hydrogen or alkyl having from one to three carbon atoms, *m* represents two or three, and $X'$ represents ethyleneoxy or propyleneoxy, then (2) curing said composition by heating the same at a temperature between about 100° to 150° C.

2. A method for inhibiting ion induced degradation and corrosion of ferrous metal substrates comprising (1) applying to such substrate a curable composition comprising (A) a diglycidyl ether of 4,4'-isopropylidene-diphenol and (B) as a curing agent a di-2-oxazoline selected from the group consisting of 2,2'-(thiodiethylene)bis-2-oxazoline, 2,2'-(oxydiethylene)bis-2-oxazoline and (tetramethylene)-bis-2-oxazoline, then (2) curing said composition by heating the same at a temperature between about 100° to 150° C.

* * * * *